United States Patent Office 3,517,192
Patented June 23, 1970

3,517,192
COLOR RADIOGRAPHY WITH THE MIXTURE OF DYES CONTAINING SUDAN III AND A DYE OF THE GROUP CONSISTING OF ANILINE BLUE, QUINOLINE BLUE, NAPHTHOL YELLOW AND META METHYL RED
Masahiro Kinoshita, Osaka, and Tsuyoshi Sunada, Amagasaki-shi, Japan, assignors to Osaka Prefecture, Osaka, Japan
No Drawing. Filed Mar. 13, 1967, Ser. No. 622,388
Int. Cl. G01n *23/04*
U.S. Cl. 250—65                                 1 Claim

ABSTRACT OF THE DISCLOSURE

Color radiography requiring no developing comprising the steps of: mixing several dyes whose sensitivities are different from one another in both qualitatively and quantitatively; dissolving the resultant mixture in a solvent; dispersing the dissolved mixture homogeneously in a basic agent; employing the homogeneously dispersed mixture as radiation sensitizer; irradiating an object to obtain a radiation penetrated image of a subject matter in dark and light shades of a plurality of colors. Also materials which are employed in carrying out the above steps.

---

The present invention relates to color radiography requiring no developing characterized by the fact that incident ionizing radiation or ultraviolet ray acts upon a mixture of several dyes whose sensitivities to the radiation are different from one another both qualitatively and quantitatively.

The first object of the present invention is to provide a method of non-destructive testing and to provide materials thereof. Under this method a multi-colored image of a subject matter can be obtained which is far superior in its discriminative power to a black and white image.

The second object of the present invention is to provide a simple method of obtaining an image without developing and to provide materials thereof.

The third object of the present invention is to provide an ingenious and convenient non-destructive testing method by making use of a radiation, and to provide materials thereof.

The fourth object of the present invention is to provide a method of indicating the distribution of irradiation intensity conveniently by means of colors, and to provide materials thereof.

Those skilled in the art are familiar with the so-called radiation penetrating photographic method which is one of the non-destructive testing methods. (The word "radiation" used herein is a general term including such ionizing radiations as X-rays, alpha particles, beta particles and neutron rays.) In this conventional method, a sensitizer whose main material is a silver salt is employed. In order to obtain a visible image from a negative plate, therefore, a latent image of the negative plate must be developed and fixed. The visible image so obtained is shown as black and white. In other words, the visible image is only a light and dark image of a single color. Thus, the image can be discriminated only by the variation in its light and dark areas, and so the image is not accurate enough to discriminate to the minutest details.

If, however, its color is diversified, the image will be composed of a combination of light and dark areas of various colors. Thus, the light and dark areas will become much diversified. And the discrimination of an image formed by these variations is much more accurate and detailed than the discrimination of a black and white image, and the degree of discriminating the image itself will be so much improved. That is a known fact today in optical observational engineering techniques of a substance.

When a photograph is taken by the conventional method, however, it is absolutely necessary to perform such after treatments as developing and fixing in a dark room. These after treatments are very troublesome. In particular, after treatments for a colored photograph is much more complicated than those for a black and white photograph. That may be said to be one of the greatest defects in photography.

In order to satisfy the requirements for a color diversification, the following method is easily conceived of: In the usual method of taking a multicolored photograph wherein sensitive layers are made in two or three layers, each layer of which is developed into a different color, and thereafter each different color is synthesized. As the layers are multi-layers, however, secondary diffused rays are emitted from the first layer, which diffused rays sensitize the next layer. This blurs the clearness of a photograph as a whole. That is one of the greatest defects in this prior art method.

It is therefore necessary to place a device, as, for example, a lead screen, between the layers for absorbing weak secondary rays. If such a device is employed, it is necessary to remove the lead screen after each photographing, to develop and fix each layer of them, and thereafter to synthesize them. These operations are so troublesome that such a device has never been put to practical use.

In order to avoid the necessity of developing, there is an attempt to take a colored photograph by means of a colored television system. For example, a subject matter is irradiated by three radiations having different wave lengths. A penetrating radiation of each respective wave length is photographed with various colors, such as, for example, red, blue, and green, and thereby a penetrated image is multi-colored. This is the so-called colored X-ray television system.

It is certain that this system requires no developing. But a device for this system is very expensive, and its structure is very complicated. Thus, this system has also never been put to practical use.

In order to obtain a photographed image according to the present invention, however, it is not necessary to develop and fix the image, nor is it necessary to operate in a dark room. The present invention does not use any conventional chemical agent, such as a silver salt or any of azo compounds or any of paraphenylene diamine series. The present invention chiefly uses a mixture of dyes which have different sensitivities to radiation as a principal sensitizer. There are a qualitative mixture of dyes and a quantitative mixture of dyes.

As the qualitative mixture, there are a varietay of mixtures mixed among the following three groups: Dyes such as, for example, Methyl Yellow, Resasurin, etc. whose colors change into another colors by irradiation; dyes such as for example, Aniline Blue, New Coccin, etc. whose colors fade by irradiation; dyes such as, for example, Rhodamine B, Eosin etc. whose colors remain practically unchanged by irradiation.

With regard to the quantitative mixture, there are a variety of mixtures of various dyes whose concentrations are different from one another. Such mixtures are made by making use of the following property of dyes: the higher the concentration, the lower the sensitivity to a radiation; and the lower the concentrtion, the higher the sensitivity to the radiation.

In any mixture, these dyes are homogeneously dispersed in a basic agent and the resultant agent is placed behind a subject matter. When a radiation is irradiated in front of the subject matter, the radiation penetrating through each part of the subject matter differs in its strength according to the concentration and thickness of each part and its ability to absorb the radiation, and the radiation having such different strengths strikes upon dyes.

In this case, dyes most sensitive to the radiation acts upon all of a strong incident radiation, a medium incident radiation and a weak incident radiation, and either changes or fades its color. (The most sensitive dye may be a dye qualitatively most sensitive or a dye quantitatiely most sensitive by making its concentration lowest.) A medium sensitive dye acts upon the strong incident radiation and the medium incident radiation, and either changes or fades its color. A weak sensitive dye acts upon only the strong incident radiation, and either changes or fades its color. A still weaker sensitive dye dos not act at all even upon the strong incident radiation, and so its color remains unchanged.

If, therefore, we have such a mixture of dyes, it is possible for use to have a penetrated image of a subject matter with variations in colors in accordance with the absorption of a radiation by the subject matter.

If we have, as a mixture of dyes to be added to a basic agent, a mixture of several dyes which change or fade their colors by a radiation and of dyes which have a strong resistance to the radiation, we can observe the following phenomena: In that portion of the subject matter which absorbs a little radiation or in that portion through which a strong radiation penetrates, only a color of a strong resistant dye remains, and the colors of the remaining dyes either change or fade. Consequently that portion shows the color of the strong resistant dyes or shows a mixed color between that color and the changed colors. In that portion of the subject matter which absorbs a large quantity of radiation or in that portion through which a weak radiation penetrates, only the most sensitive of all the dyes added changes or fades. Consequently that portion shows a mixed color of the remaining dyes or shows the color which is a mixture of said mixed color and the changed color.

As a basic agent, a synthetic resin such as a polyvinyl chloride resin or a polyacrylate resin may be used; or any material which is usually used in taking a photograph, such as gelatin, may be used; or a higher alcohol, a higher fatty acid, a higher fatty acid ester, a ketone, or a higher hydrocarbon may be used. If a polyvinyl chloride resin which liberates a halogen when it is irradiated is used as a basic agent, most of the dyes tend to be changed or discolored. Thus the sensitivity as a whole is so much improved. Therefore, it has an advantage that the time of exposure may be short.

In order to disperse dyes homogeneously in a basic agent, a solvent is used. When dyes and the basic agent are soluble in an organic solvent, the organic solvent is used as a solvent. When the dyes and the basic agent are soluble in water, water is used as a solvent. If such organic solvents are used that produce a halogen free radical or form an acid by an incident radiation (as an example of the former, halogenated hydrocarbon; and as an example of the latter, ester), it has an advantage that the time of exposure may be short. If a dye whose color is changed or discolored by a halogen or an acid is used, its sensitivity is improved, and so it has an advantage that the time of exposure may be short.

Now we are going to describe in detail some embodiments of the invention.

Example 1

As a basic agent, a polyvinyl chloride resin (virgin resin with 800–1100 of polymerization degree) was used. As mixing dyes, a mixture of Aniline Blue, whose color was changed from its original blue to achromatic color by irradiation, and of Methyl Yellow, whose color was changed from yellow through orange to red, was used. As a solvent, a re-distilled ethylene bromide was used. 10 ml. of an Aniline Blue solution with a concentration of 25 mg./100 ml. and 5 ml. of a Methyl Yellow solution with a concentration of 12 mg./100 ml. were added to 1 g. of powdered resin, and the resultant mixture was warmed up and thoroughly dissolved until the resin became homogeneous. Then the mixture was poured over a glass plate and dried and consolidated. The finished film was blue green. With 230 kv. of X-ray, we took a non-destructive testing photograph of a music box on this film and obtained a beautiful multicolored penetrated image. No developing was necessary, nor were operations in a dark room necessary. When it was irradiated by a radiation, this film showed a color spectrum of blue green→light green→yellow→orange→red. The finished film was acid proof and water proof, and would not discolor even when it was exposed to a usual diffused light. But when it was irradiated by strong ultraviolet rays, its color changes gradually and ultimately to red. In order to keep this film sound, therefor, it is enough to place it, for example, between two pieces of usual pane glass or between two pieces of plastic films or plates, each of which will not allow most of ultraviolet rays to penetrate through. If this film is coated beforehand with a layer of glass or plastics which allows ionizing radiations to penetrate through but which cuts off ultraviolet rays, it will be unaffected by ultraviolet rays without reducing its sensitivity to radiation. As particles of dispersed dyes are microscopically far smaller than sensitized particles of a X-ray film using a usual silver salt, the former is superior in its resolving power to the latter.

Also, more or less similar results were obtained by using Quinolin Blue instead of Aniline Blue, and by using Meta Methyl Red instead of Methyl Yellow. As a solvent, ethylene chloride or dioxan or pyridine could be used instead of ethylene bromide. In this case, however, its sensitivity to radiation was somewhat lowered as compared with the case in which ethylene bromide was used as a solvent. When Sudan III whose sensitivity to radiation was low was employed instead of Methyl Yellow, the color changed from blue to red by the action of the radiation.

Example 2

Gelatin was used as a basic agent. An aqueous solution of Indigo Carmine and an aqueous solution of Naphthol Yellow were added to a powdered gelatin; and the resultant mixture was warmed up and thoroughly mixed until it became homogeneous, and then poured over a glass plate and dried. A film was formed. The film showed a beautiful green color. By the same operation as that of Example 1, we took an X-ray penetrated photograph, and obtained an X-ray image showing that the interior construction of a subject matter has a color spectrum of green-yellow-white.

Example 3

As a basic agent, agar was used instead of gelatin in Example 2. Here a three-dimensional solid substance was formed instead of a film-like substance. Said solid substance was placed at a distance of 5 cm. from the irradiation window of a Linac. The electron beams were projected from the Linac. Then, it was possible to obtain the distribution of radiation field intensity of the electron beams emitted from the Linac by means of the color changes as described in Example 2.

In this case the voltage of the Linac was 14 mev.; the current, 10 microamperes (peak current being 300 ma.); 1 pulse, 4 microseconds; and repeat frequencies, 10 seconds irradiation of electron beams of 13 p.p.s.

Example 4

Paraffin with a high melting point was warmed up and dissolved. Then an ethylene bromide solution of Aniline Blue and Methyl Yellow was added to the paraffin solution and thoroughly mixed. The mixture was rapidly poured over a glass plate, and the other mixture was made to pass through a piece of paper, and then both of them were dried. As in Example 1, we used them and took X-ray penetrated photographs, and obtained penetrated images, each of which having a similar color spectrum. The sensitivity of each of them was much quicker than that of Example 1. Thus, the time of exposure became so much shorter.

In Examples 1, 2, 3, and 4, we chiefly described such a method of production in a laboratory that radiation sensitizer was poured over glass plates and then were formed in film. In the case of mass production, however, said radiation sensitizers can be made in film by rolls.

Other examples

The sensitizers described in Examples 1, 2, and 3 and 4 were used for making models of human bodies and of other three-dimensional models in various shapes. Then these models were irradiated and their cross sections were observed. The observation revealed that a radiation dose impinging upon these models was shown three-dimensionally by multi-colored colors.

As shown in the above Examples 1, 2, 3, and 4, a group of most sensitive dyes to radiation, of comparatively less sensitive dyes, and of practically non-sensitive dyes, in other words, a group of dyes whose sensitivities to radiation were different from one another and whose developed colors were also different from one another, were mixed in various ways and were dispersed in a basic agent homogeneously to form a film or a sheet-like substance. When such a film or such a sheet-like substance was used in a non-destructive testing method in order to take a radiation penetrated image of a substance, the image so obtained had light and dark areas of multi-colored colors, which was quite different from the usual black and white image.

Thus, its discriminative power was much greater than that of the black and white image; and its resolving power was also much improved because its dyes were homogeneously dispersed in a basic agent. Furthermore, developing and fixing were not necessary at all. Nor was it necessary to perform operations in a dark room. Thus, its operations were quite simple. For example, it was possible to recognize macroscopically whether exposure was sufficient or not while a photograph was being taken. As compared with a non-destructive testing method by means of the usual black and white X-ray film, the method of the present invention showed its image more minutely and had more remarkable effects.

What we claim is:

1. A color radiographic process which requires no developing step comprising:
   (a) forming an admixture of (1) an organic film-forming polymeric material and (2) at least two dyes having a different sensitivity to radiation and being capable of forming a different color when contacted by radiation, at least one of said dyes being Sudan III and at least one of said other dyes being selected from the group consisting of Aniline Blue, Quinolin Blue, Naphthol Yellow, and Meta Methyl Red;
   (b) coating a substrate with a film formed from said admixture;
   (c) providing an object to be analyzed between a source of radiation and said coated substrate; and
   (d) passing ionizing radiation through said object and into contact with said coated substrate to form a multi colored image thereon, the color and shade of any given portion of said image corresponding to the radiation absorption characteristics of the related part of said object.

References Cited

UNITED STATES PATENTS

| 1,710,076 | 4/1923 | Schlatter | 8—25 |
| 2,957,080 | 10/1960 | Schulte et al. | |
| 3,226,545 | 12/1965 | Potsaid. | |

FOREIGN PATENTS

| 920,689 | 3/1963 | Great Britain. |

OTHER REFERENCES

Farrel et al.: Nucleonics, November 1963, pp. 78–80, 82, 84 and 85.

Henley et al.: Nucleonics, December 1965, pp. 62–66.

DONALD LEVY, Primary Examiner

U.S. Cl. X.R.

8—25, 2, 65; 96—2